United States Patent [19]

Muehlbach et al.

[11] Patent Number: 5,145,904
[45] Date of Patent: Sep. 8, 1992

[54] REINFORCED COLORED THERMOPLASTIC MOLDING MATERIALS BASED ON POLYPHENYLENE ETHERS AND POLYAMIDES

[75] Inventors: Klaus Muehlbach, Heppenheim; Peter Steiert, Ludwigshafen; Klaus Benker, Neustadt, all of Fed. Rep. of Germany

[73] Assignee: BASF Aktiengesellschaft, Ludwigshafen, Fed. Rep. of Germany

[21] Appl. No.: 541,784

[22] Filed: Jun. 21, 1990

[30] Foreign Application Priority Data

Jul. 11, 1989 [DE] Fed. Rep. of Germany ....... 3922739

[51] Int. Cl.$^5$ ............... C08J 5/08; C08K 3/40; C08L 71/02
[52] U.S. Cl. ................... 524/494; 523/220; 524/496; 524/508; 524/538; 524/611
[58] Field of Search ............... 524/508, 611, 538, 494, 524/496; 523/220

[56] References Cited

U.S. PATENT DOCUMENTS 4,957,965 9/1990 Taubitz et al. .............. 524/508

FOREIGN PATENT DOCUMENTS

| | | |
|---|---|---|
| 0046040 | 2/1982 | European Pat. Off. . |
| 236596 | 9/1987 | European Pat. Off. . |
| 244090 | 11/1987 | European Pat. Off. . |
| 248526 | 12/1987 | European Pat. Off. . |
| 0260123 | 3/1988 | European Pat. Off. . |
| 0183195 | 6/1986 | Fed. Rep. of Germany . |
| 63-035652 | 2/1988 | Japan . |
| 63-101452 | 5/1988 | Japan . |
| WO8505372 | 12/1985 | PCT Int'l Appl. . |
| WO8602086 | 4/1986 | PCT Int'l Appl. . |
| WO8705304 | 9/1987 | PCT Int'l Appl. . |

Primary Examiner—Paul R. Michl
Assistant Examiner—U. K. Kajguru
Attorney, Agent, or Firm—Oblon, Spivak, McClelland, Maier & Neustadt

[57] ABSTRACT

Filler-containing thermoplastic molding materials contain, as essential components, A) from 10 to 84.8% by weight of a thermoplastic polyamide,
B) from 10 to 84.8% by weight of a modified polyphenylene ether,
C) from 5 to 50% by weight of glass fibers or carbon fibers or a mixture thereof, having a median fiber length $l_{50}$ of from 150 to 400 μm, and
D) from 0.2 to 4% by weight of a pigment and in addition E) from 0 to 4% by weight of a rubber impact modifier,
F) from 0 to 20% by weight of a particulate filler which differs from D) and
G) from 0 to 20% by weight of a flameproofing agent.

7 Claims, No Drawings

REINFORCED COLORED THERMOPLASTIC MOLDING MATERIALS BASED ON POLYPHENYLENE ETHERS AND POLYAMIDES

The present invention relates to filler-containing thermoplastic molding materials containing, as essential components, A) from 10 to 84.8% by weight of a thermoplastic polyamide,
B) from 10 to 84.8% by weight of a modified polyphenylene ether,
C) from 5 to 50% by weight of glass fibers or carbon fibers or a mixture thereof, having a median fiber length $l_{50}$ of from 150 to 400 μm, and
D) from 0.2 to 4% by weight of a pigment as well as E) from 0 to 4% by weight of a rubber impact modifier,
F) from 0 to 20% by weight of a particulate filler which differs from D) and
G) from 0 to 20% by weight of a flameproofing agent.

The present invention furthermore relates to the use of these molding materials for the production of moldings, and the moldings obtainable using these molding materials as essential components.

Blends of modified polyphenylene ethers and polyamides, which may contain fillers, are disclosed in WO 85/05372, EP-A 260 123, WO 87/05304, EP-A 46 040 and WO 86/02086.

Fibrous or particulate fillers in blends of polyphenylene ethers and polyamides often have a disadvantageous effect on the mechanical properties of the moldings. This applies in particular to fiber-reinforced products, which have to be colored for the particular intended use since the yellowish natural hue of these blends is not always desirable.

Colored fiber-reinforced moldings often have an unsatisfactory surface since the color impression is generally non-uniform.

The prior art blends have insufficient rigidity (modulus of elasticity) owing to the addition of significant amounts (generally more than 10% by weight) of impact-modifying polymers.

It is an object of the present invention to provide thermoplastic molding materials which have a good overall spectrum of mechanical properties and in particular good reproducibility of the impact strengths. In addition, the rigidity and flow should as far as possible not be disadvantageously affected and the color impression of the surfaces should be uniform.

We have found that this object is achieved by the molding materials defined at the outset.

Preferred materials of this type and their use are described in the subclaims.

The polyamides present as component A) in the materials are known per se and comprise the partly crystalline and amorphous resins which have weight average molecular weights of not less than 5,000 and are usually referred to as nylon. Such polyamides are described in, for example, U.S. Pat. Nos. 2,071,250, 2,071,251, 2,130,523, 2,130,948, 2,241,322, 2,312,966, 2,512,606 and 3,393,210.

The polyamides can be prepared, for example, by condensation of equimolar amounts of a saturated or aromatic dicarboxylic acid of 4 to 12 carbon atoms with a saturated or aromatic diamine of not more than 14 carbon atoms, or by condensation of ω-aminocarboxylic acids or polyaddition of lactams.

Examples of polyamides are polyhexamethyleneadipamide (nylon 66), polyhexamethyleneazelaamide (nylon 69), polyhexamethylenesebacamide (nylon 610), polyhexamethylenedodecanediamide (nylon 612), the polyamides obtained by subjecting lactams to a ring-opening reaction, such as polycaprolactam and polylaurolactam, as well as poly-11-aminoundecanoic acid and a polyamide obtained from di-(p-aminocyclohexyl)-methane and dodecanedioic acid.

It is also possible, according to the invention, to use polyamides which have been prepared by copolycondensation of two or more of the abovementioned polymers or their components, for example copolymers of adipic acid, isophthalic acid or terephthalic acid and hexamethylenediamine or copolymers of caprolactam, terephthalic acid and hexamethylenediamine. Linear polyamides having a melting point above 200° C. are preferred.

Preferred polyamides are polyhexamethyleneadipamide, polyhexamethylenesebacamide and polycaprolactam, as well as polyamide 6/6T and polyamide 66/6T. The polyamides generally have a relative viscosity of from 2.0 to 5, determined for a 1% strength by weight solution in 96% strength sulfuric acid at 23° C., which corresponds to a molecular weight of about 15,000–45,000. Polyamides having a relative viscosity of from 2.4 to 3.5, in particular from 2.5 to 3.4, are preferably used.

Other polyamides are those which are obtainable, for example, by condensation of 1,4-diaminobutane with adipic acid at elevated temperatures (nylon 46). Preparation processes for polyamides having this structure are described in, for example, EP-A 38 094, EP-A 38 582 and EP-A 29 524.

The amount of the polyamides A) in the novel molding materials is from 10 to 84.8, preferably from 20 to 70, in particular from 25 to 60, % by weight.

The novel molding materials contain, as component B), from 10 to 84.8, preferably from 20 to 70, in particular from 25 to 60, % by weight of a modified polyphenylene ether. Blends which contain from 55 to 95% by weight of a modified polyphenylene ether with $b_1$) are preferred.

The polyphenylene ethers generally have a weight average molecular weight of from 10,000 to 80,000, preferably from 20,000 to 60,000.

This corresponds to a reduced specific viscosity $\eta_{red}$ of from 0.2 to 9, preferably from 0.35 to 0.8, in particular from 0.45 to 0.6, dl/g, measured in a 1% strength by weight solution in chloroform at 25° C. according to DIN 53,726.

The unmodified polyphenylene ethers $b_1$) are known per se and are preferably prepared by oxidative coupling of phenols disubstituted in the o-position.

Examples of substituents are halogen atoms, such as chlorine or bromine, and alkyl radicals of 1 to 4 carbon atoms which preferably have no α tertiary hydrogen atom, eg. methyl, ethyl, propyl or butyl. The alkyl radicals may in turn be substituted by halogen atoms, such as chlorine or bromine, or by a hydroxyl group. Other examples of possible substituents are alkoxy radicals, preferably of not more than 4 carbon atoms, or phenyl which is unsubstituted or substituted by halogen atoms and/or alkyl groups. Copolymers of various phenols, for example copolymers of 2,6-dimethylphenol and 2,3,6-trimethylphenol, are also suitable. It is of course also possible to use mixtures of different polyphenylene ethers.

Preferably used polyphenylene ethers are those which are compatible with vinylaromatic polymers, ie. are completely or very substantially soluble in these polymers (cf. A. Noshay, Block Copolymers, pages 8–10, Academic Press, 1977, and O. Olabisi, Polymer-Polymer Miscibility, 1979, pages 117–189).

Examples of polyphenylene ethers are poly-(2,6-dilauryl-1,4-phenylene) ether, poly-(2,6-diphenyl-1,4phenylene) ether, poly-(2,6-dimethoxy-1,4-phenylene) ether, poly-(2,6-diethoxy-1,4-polyphenylene) ether, poly-(2-methoxy-6-ethoxy-1,4-phenylene) ether, poly-(2-ethyl-6-stearyloxy-1,4-phenylene) ether, poly-(2,6-dichloro-1,4-phenylene) ether, poly-(2-methyl-6-phenylene-1,5-phenylene) ether, poly-(2,6-dibenzyl-1,4-phenylene) ether, poly-(2-ethoxy-1,4-phenylene) ether, poly-(2-chloro-1,4-phenylene) ether and poly-(2,5-dibromo-1,4-phenylene) ether. Preferably used polyphenylene ethers are those in which the substituents are alkyl of 1 to 4 carbon atoms, such as poly-(2,6-dimethyl-1,4-phenylene) ether, poly-(2,6-diethyl-1,4-phenylene) ether, poly-(2-methyl-6-ethyl-1,4-phenylene) ether, poly-(2-methyl-6-propyl-1,4-phenylene) ether, poly-(2,6-dipropyl-1,4-phenylene) ether and poly-(2-ethyl-6-propyl-1,4-phenylene) ether.

Graft copolymers of polyphenylene ethers and vinylaromatic polymers, such as styrene, α-methylstyrene, vinyltoluene and chlorostyrene, are also suitable.

The novel molding materials may contain up to 30% by weight of an agent for imparting compatibility between the phases. When it is present, it increases the compatibility between polyamide and polyphenylene ether and is advantageously used in amounts of from 0.05 to 30% by weight, particularly when an unmodified polyphenylene ether $b_1$) is used in the novel molding materials. Such an agent is a substance which facilitates mixing of two incompatible polymers and improves the adhesion between the phases in such systems (cf. for example O. Olabisi, Polymer-Polymer Miscibility, Acad. Press 1979, Chapter 1). In practice, this means that the tendency for delamination in multiphase polymer systems is reduced. Such agents for A) and B) are known per se.

For example, from 0.05 to 15% by weight, based on the sum of A to C and, where present, D, E and F, of a diene polymer $b_{11}$), of an epoxy compound $b_{12}$) or of a compound $b_{13}$) which has one or more C—C double bonds or triple bonds or one or more carboxyl, anhydride, amide, imide, carboxylic ester, amino, hydroxyl, epoxy, oxazoline, urethane, urea, lactam or halobenzyl groups in the molecule can be used. Such substances are described in, for example, EP-A 24 120. $b_{11}$) may be liquid polybutadiene, polyisoprene, poly-1,3-pentadiene or their copolymers with styrene, α-methylstyrene or p-hydroxystyrene, having a number average molecular weight of from 150 to 10,000.

Suitable epoxy-containing compounds $b_{12}$) are epoxy resins of epichlorohydrin and polyhydroxyphenols such as bisphenol A, hydroquinone or resorcinol, and glycidyl ether-modified phenol or cresol novolaks or phenoxy resins. Epoxy resins of epichlorohydrin and polyhydroxyalcohols, such as ethylene glycol, propylene glycol or butylene glycol, polyethylene glycol, polypropylene glycol, glycerol, trimethylolethane and pentaerythritol and glycidyl ethers of phenols or aliphatic alcohols, or glycidyl derivatives of amines, for example the diglycidyl derivatives of aniline, can also be used. Epoxidized natural unsaturated oils and epoxidation products of the abovementioned low molecular weight diene polymers $b_{11}$) can also be used. The compounds $b_{13}$) are, for example, maleic anhydride, maleic hydrazide, dichloromaleic anhydride, maleimide, maleic acid, fumaric acid, their amides, diamides, monoesters, diesters, bisamides or bismaleimides of $C_1$–$C_{20}$-alkanediamines or alkylenediamines, natural fats and oils, such as soybean oil, unsaturated acids, such as (meth)acrylic acid, their esters, amides or anhydrides, unsaturated alcohols, such as allyl or crotyl alcohol, methylvinylcarbinol or propargyl alcohol, unsaturated amines, such as allylamine or crotylamine, or adducts of the diene polymers $b_{11}$) and maleic anhydride.

Other suitable agents for imparting compatibility between the phases are vinylaromatic polymers which contain one of the functional compounds stated above under $b_{13}$), in amounts of from 2 to 30, preferably from 2 to 15, % by weight, based on the novel molding materials. These polymers are obtained by copolymerization of vinylaromatic monomers, such as styrene, α-methylstyrene or p-methylstyrene, with copolymerizable functionalized monomers stated above under $b_{13}$) or by grafting these monomers onto vinylaromatic polymers, such as polystyrene. Such compatibility-imparting agents are disclosed in, for example, EP-A 46 040, EP-A 147 874, EP-A 255 184, DE-A 3 535 273 or DE-A 3 619 224. Styrene/maleic acid copolymers or unhydrogenated or partially hydrogenated styrene/butadiene block copolymers modified with maleic anhydride are also suitable.

From 0.05 to 15% by weight, based on the sum of A to D and, where present, E, F and G, of oxidized polyolefins according to EP-A 164 767 are also suitable.

From 0.05 to 10% by weight of silicon compounds which have at least one Si-O-C group and one C—C double or C—C triple bond or one amino or mercapto group bonded indirectly to Si, such as γ-aminopropyltriethoxysilane or vinyl-tris-(2-methoxyethoxy)-silane, are also suitable. Such compounds are disclosed in EP-A 182 163.

Functionalized or modified polyphenylene ethers B) are known per se, for example from WO-A 87/02086, WO-A 87/00540, EP-A-222 246, EP-A-223 116 and EP-A-254 048.

The polyphenylene ether $b_1$) is usually modified by incorporating one or more carbonyl, carboxyl, anhydride, amide, imide, carboxylic ester, carboxylate, amino, hydroxyl, epoxy, oxazoline, urethane, urea, lactam or halobenzyl groups, so that sufficient compatibility with the second polymer of the mixture, the polyamide, is ensured. The agent imparting compatibility between the phases can thus be dispensed with by modifying polyphenylene ether $b_1$).

Modification is generally carried out by reacting a polyphenylene ether $b_1$) with a modifier which contains one or more of the abovementioned groups, in solution (WO-A 86/2086), in aqueous dispersion, in a gas-phase process (EP-A-25 200) or in the melt in the presence or absence of suitable vinylaromatic polymers or impact modifiers, and a free radical initiator may be present.

Suitable modifiers ($b_3$) are, for example, maleic acid, methylmaleic acid, itaconic acid, tetrahydrophthalic acid, their anhydrides and imides, fumaric acid, the mono- and diesters of these acids, for example with $C_1$- and $C_2$–$C_8$-alkanols (monomers $B_{31}$), the mono- or diamides of these acids, such as N-phenylmaleamide (monomers b$_{32}$), maleic hydrazide, the acyl chloride of trimellitic anhydride, benzene-1,2-dicarboxylic anhydride-4-carboxylic acid acetic anhydride, chloroethanoylsuccinaldehyde, chloroformylsuccinaldehy-de, citric acid and hydroxysuccinic acid. Examples of monomers b$_{33}$ are N-vinylpyrrolidone and (meth)acryloylcaprolactam.

A modified polyphenylene ether which is preferably used as component B) in the novel molding materials is one which is obtainable by reacting b$_1$) from 9.95 to 99.94% by weight of an unmodified polyphenylene ether, b$_2$) from 0 to 90% by weight of a vinylaromatic polymer, b$_3$) from 0.05 to 10% by weight of one or more compounds from the group consisting of b$_{31}$) an $\alpha,\beta$-unsaturated dicarbonyl compound, b$_{32}$) an amide-containing monomer having a polymerizable double bond and b$_{33}$) a lactam-containing monomer having a polymerizable double bond, b$_4$) from 0 to 80% by weight of other graft-active monomers and b$_5$) from 0.01 to 0.09% by weight of a free radical initiator, the percentages by weight being based on the sum of b$_1$) to b$_5$), in the course of from 0.5 to 15 minutes at from 240 to 375° C. in suitable mixing and kneading apparatuses, such as twin-screw extruders.

The vinylaromatic polymer b$_2$) is preferably compatible with the polyphenylene ether used.

The molecular weight of these conventional polymers is in general from 1,500 to 2,000,000, preferably from 70,000 to 1,000,000.

Examples of preferred vinylaromatic polymers which are compatible with polyphenylene ethers are described in the abovementioned monograph by Olabisi, pages 224 to 230 and 245. Vinylaromatic polymers of styrene, chlorostyrene, α-methylstyrene and p-methylstyrene may be mentioned here merely as typical examples; comonomers such as (meth)acrylonitrile or (meth)acrylates may also be present as polymerized units in minor amounts (preferably not more than 20, in particular not more than 8, % by weight). Particularly preferred vinylaromatic polymers are polystyrene and high impact polystyrene. Mixtures of these polymers can of course also be used. The preparation is preferably carried out by the process described in EP-A-302 485.

Other comonomers b$_4$) which, under the preparation conditions, react with the components b$_1$ and, where relevant, b$_2$) or are grafted onto these may also be used in the preparation of the modified polyphenylene ether B. Examples of these are acrylic acid, methacrylic acid, acrylates, methacrylates and vinylaromatic monomers, such as styrene, α-methylstyrene and vinyltoluene, to mention but a few.

The amount of component b$_4$) is from 0 to 80, preferably from 0 to 45, in particular not more than 20, % by weight, based on the sum of components b$_1$) to b$_5$). Particularly preferred molding materials are those which do not contain any component b$_4$).

Examples of free radical initiators b$_5$) are: di-(2,4-dichlorobenzoyl) peroxide, tert-butyl peroxide, di-(3,5,5-trimethylhexanol) peroxide, dilauroyl peroxide, didecanoyl peroxide, dipropionyl peroxide, dibenzoyl peroxide, tert-butyl peroxy-2-ethylhexanoate, tert-butyl peroxydiethylacetate, tert-butylperoxyisobutyrate, 1,1-di-tert-butylperoxy-3,3,5-trimethylcyclohexane, tertbutyl peroxyisopropyl carbonate, tert-butyl peroxy-3,3,5trimethylhexanoate, tert-butyl peracetate, tert-butyl perbenzoate, butyl 4,4-di-tert-butylperoxyvalerate, 2,2-di-tert-butylperoxybutane, dicumyl peroxide, tert-butyl cumyl peroxide, 1,3-di-(tert-butylperoxyisopropyl)benzene and di-tert-butyl peroxide. Other examples are organic hydroperoxides, such as diisopropylbenzene monohydroperoxide, cumene hydroperoxide, tert-butyl hydroperoxide, p-menthyl hydroperoxide and pinane hydroperoxide, and highly branched alkanes of the general structure

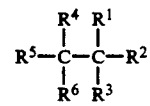

where $R^1$ to $R^6$ independently of one another are each alkyl of 1 to 8 carbon atoms, alkoxy of 1 to 8 carbon atoms, aryl, such as phenyl, naphthyl or 5-membered or 6-membered heterocycles having an $\pi$-electron system and nitrogen, oxygen or sulfur as heteroatoms. $R^1$ to $R^6$ may in turn contain functional groups as substituents, such as carboxyl, carboxyl derivative, hydroxyl, amino, thiol or epoxy groups. Examples are 2,3-dimethyl-2,3-diphenylbutane, 3,4-dimethyl-3,4-diphenylhexane and 2,2,3,3-tetraphenylbutane.

The novel molding materials contain, as component C), from 5 to 40, preferably from 9.5 to 40, in particular from 10 to 35, % by weight of glass fibers or carbon fibers or a mixture thereof.

In the case of the novel component C), the median fiber length $l_{50}$ in the granules or in the moldings is important since, as desired, the moldings have a very good overall profile of mechanical properties if the median fiber length $l_{50}$ is from 150 to 400 μm, preferably from 170 to 300 μm, in particular from 180 to 280 μm.

The median fiber length $l_{50}$ is in general the value for which 50% of the fibers have a length smaller than the $l_{50}$ value and 50% of the fibers have a greater length.

The glass fibers may either contain alkali metals or be free of alkali metals. When glass fibers are used, they may be treated with a size, for example polyurethane or an epoxide, and an adhesion promoter, for example an aminotrialkoxysilane, to improve the compatibility with the thermoplastic. In general, the fibers used have a diameter of from 6 to 20 μm.

These glass fibers may be incorporated in the form of both short glass fibers and rovings.

The novel molding materials contain, as component D), from 0.2 to 4, preferably from 0.5 to 3.5, in particular from 0.5 to 3, % by weight of a pigment.

The pigments for coloring thermoplastics are generally known (cf. for example R. Gächter and H. Müller, Taschenbuch der Kunststoffadditive, Carl Hanser Verlag 1983, pages 494–510). A first preferred group of pigments comprises white pigments, such as zinc oxide, zinc sulfide, lead white (2 PbCO$_3$.Pb(OH)$_2$), lithopone, antimony white and titanium dioxide. Of the two most commonly used crystal modifications (rutile and anatase types) of titanium dioxide, the rutile form is used in particular for imparting a white color to the novel molding materials.

Black pigments which may be used according to the invention are iron oxide black (Fe$_3$O$_4$) spinel black (Cu(Cr,Fe)$_2$O$_4$), manganese black (mixture of manganese dioxide, silica and iron oxide), cobalt black and antimony black and particularly preferably carbon black, which is generally used in the form of furnace black or gas black (in this context, see G. Benzing, Pigmente für Anstrichmittel, Expert-Verlag (1988), page 78 et seq.).

Inorganic colored pigments, such as chrome oxide green, or organic colored pigments, such as azo pigments and phthalocyanines, can of course also be used according to the invention for obtaining certain hues. Such pigments are generally available commercially.

It may also be advantageous to use the stated pigments or dyes as a mixture, for example carbon black with copper phthalocyanines, since in general color dispersion in the thermoplastic is facilitated.

In addition to the essential components A), B), C) and D), the novel molding materials may contain from 0 to 4, preferably from 0.5 to 3.5, in particular from 0.1 to 2, % by weight of a rubber impact modifier. It is possible to use conventional impact modifiers E) which are suitable for polyamides (component A), and rubbers E) which usually toughen polyphenylene ethers B).

Preferred elastomeric polymers E) for polyamides A) are those which have reactive groups at the surface.

Such groups are, for example, epoxy, carboxyl, latent carboxyl, amino or amide groups and functional groups which may be introduced by using monomers of the general formula

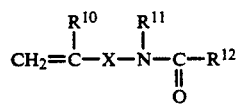

where $R^{10}$ is hydrogen or $C_1$-$C_4$-alkyl, $R^{11}$ is hydrogen, $C_1$-$C_8$-alkyl or aryl, in particular phenyl, $R^{12}$ is hydrogen, $C_1$-$C_{10}$-alkyl, $C_6$-$C_{12}$-aryl or $OR^{13}$, $R^{13}$ is $C_1$-$C_8$-alkyl or $C_6$-$C_{12}$-aryl, which may be unsubstituted or substituted by O- or N-containing groups, X is a chemical bond, $C_1$-$C_{10}$-alkylene or $C_6$-$C_{12}$-arylene or

Y is —O—Z— or —NH—Z— and Z is $C_1$-$C_{10}$-alkylene or $C_6$14 $C_{12}$-arylene.

The graft monomers described in EP-A 208 187 are also suitable for introducing reactive groups at the surface.

Examples of monomers by means of which the stated functional groups can be introduced are glycidyl methacrylate, glycidyl acrylate, allyl glycidyl ether, vinyl glycidyl ether, glycidyl itaconate, acrylic acid, methacrylic acid and their metal, in particular alkali metal, and ammonium salts, maleic acid, fumaric acid, itaconic acid, vinylbenzoic acid, vinylphthalic acid, monoesters of these acids with alcohols ROH, where R is of not more than 29 carbon atoms and is, for example, methyl, ethyl, propyl, isopropyl, n-butyl, isobutyl, hexyl, cyclohexyl, octyl, 2-ethylhexyl, decyl, stearyl, methoxyethyl, ethoxyethyl or hydroxyethyl. Maleic anhydride and esters of acrylic acid or methacrylic acid with tertiary alcohols, eg. tert-butyl acrylate, have no free carboxyl groups but have similar behavior to the free acids and are therefore designated as monomers having latent acid groups.

Further examples are acrylamide, methacrylamide and substituted esters of acrylic acid or methacrylic acid, such as N-tert-butylaminoethyl methacrylate, N,N-dimethylaminoethyl acrylate, N,N-dimethylaminomethyl acrylate and N,N-diethylaminoethyl acrylate.

The amount of the groups derived from the abovementioned monomers is in general from 0.5 to 40, preferably from 0.5 to 25, % by weight, based on the total weight of the rubber.

These monomers may be either copolymerized with the other monomers during the preparation of the rubber or grafted onto an already prepared, unmodified rubber (if necessary in the presence of initiators, for example free radical initiators).

The rubbers are in general polymers which are preferably composed of two or more of the following monomers as principal components: ethylene, propylene, butadiene, isobutene, isoprene, chloroprene, vinyl acetate, styrene, acrylonitrile, (meth)acrylic acid and acrylates and methacrylates where the alcohol component is of 1 to 18 carbon atoms.

A first preferred group comprises the ethylene/propylene (EPM) or ethylene/propylene/diene (EPDM) rubbers, which preferably have a ratio of ethylene radicals to propylene radicals of from 40:60 to 90:10.

The Mooney viscosities (ML1+4/100° C.) of such uncrosslinked EPM or EPDM rubbers (gel contents generally less than 1% by weight) are preferably from 25 to 100, in particular from 35 to 90 (measured using the large rotor after a running time of 4 minutes at 100° C. according to DIN 53,523).

EPM rubbers generally have virtually no double bonds, whereas EPDM rubbers may contain from 1 to 20 double bonds per 100 carbon atoms.

Examples of diene monomers for EPDM rubbers are conjugated dienes, such as isoprene and butadiene, non-conjugated dienes of 5 to 25 carbon atoms, such as penta-1,4-diene, hexa-1,4-diene, hexa-1,5-diene, 2,5-dimethyl-hexa-1,5-diene and octa-1,4-diene, cyclic dienes, such as cyclopentadiene, cyclohexadienes, cyclooctaoienes and dicyclopentadiene, and alkenylnorbornenes, such as 5-ethylidene-2-norbornene, 5-butylidene-2-norbornene, 2- methallyl-5-norbornene and 2-isopropenyl-5-norbornene, and tricyclodienes, such as 3-methyltricylco[5.2.1.0.2.6]-3,8-decadiene, or mixtures thereof. Hexa-1,5-diene, 5-ethylidenenorbornene and dicyclopentadiene are preferred. The diene content of the EPDM rubbers is in general from 0.5 to 50, in particular from 3 to 15, % by weight, based on the total weight of the rubber.

EPM and EPDM rubbers are usually grafted with the abovementioned monomers carrying reactive groups. Only acrylic acid, methacrylic acid and derivatives thereof and maleic anhydride are mentioned here as examples.

Another group of rubbers comprises copolymers of ethylene with esters of acrylic or methacrylic acid, for example with the methyl, ethyl, propyl, n-butyl, isobutyl, tert-butyl and 2-ethylhexyl esters. The rubbers may additionally contain the abovementioned reactive groups, for example in the form of dicarboxylic acids, derivatives of these acids, vinyl esters and vinyl ethers.

The ethylene content of the copolymers is in general from 50 to 98% by weight and the amount of epoxy-containing monomers and the amount of acrylate and/or methacrylate are each from 1 to 49% by weight.

Olefin polymers of from 50 to 98.9, in particular from 60 to 95, % by weight of ethylene, from 0.1 to 20, in particular from 0.15 to 15, % by weight of glycidyl acrylate and/or glycidyl methacrylate, acrylic acid and/or maleic anhydride, from 1 to 45, in particular from 10 to 35, % by weight of n-butyl acrylate and/or 2-ethylhexyl acrylate are preferred.

The ethylene copolymers described above can be prepared by conventional processes, preferably by random copolymerization under high pressure and at elevated temperatures. Appropriate processes are described in the literature.

The melt flow index of the ethylene copolymers is in general from 1 to 80 g/10 min (measured at 190° C. and under a load of 2.16 kg).

Other suitable elastomers for toughening polyamide are graft copolymers, containing reactive groups, with butadiene, butadiene/styrene, butadiene/acrylonitrile and acrylate rubbers as the grafting base, as described in, for example, DE-A 16 94 173, DE-A- 23 48 377, DE-A- 24 44 584 and DE-A 27 26 256. Among these, the ABS polymers, as described in DE-A-20 35 390, DE-A-22 48 242 and EP-A-22 216, may be mentioned.

Suitable rubbers E are graft polymers of from 25 to 98% by weight of an acrylate rubber having a glass transition temperature of less than −20° C., as the grafting base (base polymer) and from 2 to 75% by weight of a copolymerizable ethylenically unsaturated monomer whose homo- or copolymers have a glass transition temperature of more than 25° C., as the graft (graft shell).

The grafting base is an acrylate or methacrylate rubber, and up to 40% by weight of further comonomers may be present. The $C_1$–$C_8$-esters of acrylic acid or methacrylic acid and their halogenated derivatives, including aromatic acrylates and mixtures thereof, are usually used. Examples of comonomers in the grafting base are acrylonitrile, methacrylonitrile, styrene, α-methylstyrene, acrylamides, methacrylamides and vinyl $C_1$–$C_6$-alkyl ethers.

The grafting base may be uncrosslinked or partially or completely crosslinked. Crosslinking is achieved, for example, by copolymerization of, preferably, from 0.02 to 5, in particular from 0.05 to 2, % by weight of a crosslinking monomer having more than one double bond. Suitable crosslinking monomers are described in, for example, DE-A 27 26 256 and EP-A 50 265.

Preferred crosslinking monomers are triallyl cyanurate, triallyl isocyanurate, triacryloylhexahydros-triazine and triallylbenzenes.

If the crosslinking monomers have more than 2 polymerizable double bonds, it is advantageous to limit their amount to not more than 1% by weight, based on the grafting base.

Suitable grafting bases are emulsion polymers having a gel content of more than 60% by weight (determined in dimethylformamide at 25° C. according to M. Hoffmann, H. Krömer, R. Kuhn, Polymeranalytik, Georg-Thieme-Verlag, Stuttgart, 1977).

Other suitable grafting bases are acrylate rubbers having a diene core, as described in, for example, EP- 50 262.

Particularly suitable graft monomers are styrene, α-methylstyrene, acrylonitrile, methacrylonitrile and methyl methacrylate or mixtures thereof, in particular those of styrene and acrylonitrile in a weight ratio of from 1:1 to 9:1.

The reactive groups can be introduced into the graft copolymers by, for example, the concomitant use of the corresponding monomers in the preparation of the graft shell. In this case, the amount of the graft monomer mixture is preferably from 0.5 to 30, in particular from 1 to 25, % by weight. It is also possible to apply the corresponding monomers separately as a final graft shell.

The grafting yield, ie. the quotient of the amount of grafted monomers and the amount of graft monomers used is in general from 20 to 90%.

Examples of other rubbers are those which toughen the polyphenylene ether B).

Examples are thermoplastic rubbers, such as polybutadiene, polybutene, polyisoprene, acrylonitrile/butadiene, ethylene/propylene, polyester or ethylene rubbers and elastomeric copolymers of ethylene and esters of (meth)acrylic acid, for example ethylene/butyl acrylate copolymers. Further examples are ionomers, polyoctenylenes, graft rubbers having a graft core of butadiene or isoprene or alkyl (meth)acrylates and a graft shell of styrene and/or α-methylstyrene, and preferably styrene/butadiene block copolymers, including AB, ABA and ABAB block copolymers, which may also be tapered, star block copolymers and the like, similar isoprene block copolymers and (partially) hydrogenated block copolymers. These rubbers can also be used in a form grafted with vinylaromatic polymers, such as styrene (EP-A 234 063 and U.S. Pat. No. A 4 681 915).

The rubbers E preferably have a glass transition temperature of less than −30° C., in particular less than −40° C. Mixtures of the abovementioned rubber types may of course also be used.

The novel molding materials may contain, as a further component, from 0 to 20, preferably from 2 to 15, % by weight of a particulate filler (component F) which differs from D) or a mixture of such fillers.

Suitable particulate fillers are amorphous silica, asbestos, calcium carbonate (chalk), powdered quartz, mica, talc, feldspar and in particular calcium silicates, such as wollastonite and kaolin (in particular calcined kaolin).

Preferred combinations of fillers are, for example, 20% by weight of glass fibers (component C) with 15% by weight of wollastonite and 15% by weight of glass fibers (component C) with 15% by weight of wollastonite.

The novel molding materials may furthermore contain flameproofing agents G) in amounts of from 0 to 20, preferably from 1 to 15, % by weight, based on the total weight of the molding materials.

All known flameproofing agents, for example polyhalobiphenyl, polyhalodiphenyl ether, polyhalophthalic acid and its derivatives, polyhalooligocarbonates and polyhalopolycarbonates, are suitable, the corresponding bromine compounds being particularly effective.

Examples of these are polymers of 2,6,2',6'-tetrabromobisphenol A, of tetrabromophthalic acid, of 2,6-dibromophenol and of 2,4,6-tribromophenol and their derivatives.

A preferred flameproofing agent G) is elemental phosphorus. As a rule, the elemental phosphorus can be phlegmatized or coated with, for example, polyurethanes or other aminoplasts. Masterbatches of red phosphorus, for example in a polyamide, elastomer or polyolefin, are also suitable.

1,2,3,4,7,8,9,10,13,13,14,14-dodecachloro-1,4,4a,5,6-,6a,7,10,10a,11,12,12a-dodecahydro-1,4:7,10-dimethanobenzo{a,e}cyclooctane (Dechlorane ®Plus, Occidental Chemical Corp.) and, if necessary, a synergistic agent, eg. antiomy trioxide, are particularly preferred.

Other phosphorus compounds, such as organic phosphoric acid, phosphonates, phosphinates, phosphonites, phosphinites, phosphine oxides, phosphines, phosphites or phosphates, are also preferred. Triphenylphosphine oxide is an example. It can be used alone or mixed with hexabromobenzene or with a chlorinated biphenyl or red phosphorus or, alternatively, antimony oxide.

Typical of the preferred phosphorus compounds which can be used according to the present invention are those of the general formula

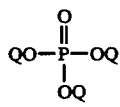

where the radicals Q are identical or different hydrocarbon radicals, such as alkyl, cycloalkyl, aryl, alkyl-substituted aryl, aryl-substituted alkyl, halogen, hydrogen or a combination thereof, provided that one or more of the radicals Q are aryl. Examples of suitable phosphates of this type are the following: phenyl bisdodecyl phosphate, phenyl bisneopentyl phosphate, phenyl ethylene hydrogen phosphate, phenyl bis-(3,5,5'-trimethylhexyl) phosphate, ethyl diphenyl phosphate, 2-ethylhexyl di-p-tolyl phosphate, diphenyl hydrogen phosphate, bis-(2-ethylhexyl) phenyl phosphate, tri-(nonylphenyl) phosphate, phenyl methyl hydrogen phosphate, didodecyl p-tolyl phosphate, tricresyl phosphate, triphenyl phosphate, dibutyl phenyl phosphate and diphenyl hydrogen phosphate. The preferred phosphates are those in which each radical Q is aryl. The most preferable phosphate is triphenyl phosphate. A combination of triphenyl phosphate with hexabromobenzene and antimony trioxide is also preferred.

Other suitable flameproofing agents are compounds which contain phosphorus-nitrogen bonds, such as phosphononitrile chlorides, phosphoric ester amides, phosphoric ester amines, phosphoramides, phosphonamides, phosphinamides, tris-(aziridinyl)-phosphine oxide or tetrakis-(hydrox-ymethyl)phosphonium chloride. The majority of these flame-retardant additives are commercially available.

Other halogen-containing flameproofing agents are tetrabromobenzene, hexachlorobenzene and hexabromobenzene and halogenated polystyrenes and polyphenylene ethers.

The halogenated phthalimides described in DE-A19 46 924 can also be used. Among these, N,N'-ethylenebistetrabromophthalimide has proven particularly important.

In addition to the essential components A), B) C) and D) and, if required, E) to G), the novel molding materials may contain conventional additives and processing assistants. The amount of these is in general not more than 20, preferably not more than 10, % by weight of the total weight of components A) to G).

Examples of conventional additives are stabilizers and antioxidants, heat stabilizers and UV stabilizers, lubricants and mold release agents, dyes, pigments and plasticizers.

Antioxidants and heat stabilizers which can be added to the thermoplastic materials according to the invention are, for example, halides of metals of group I of the Periodic Table, for example sodium halides, potassium halides and lithium halides, if necessary in conjunction with copper(I) halides, eg. chlorides, bromides and iodides. Zinc fluoride and zinc chloride can also be used. Sterically hindered phenols, hydroquinones, substituted members of this group and mixtures of these compounds, preferably in concentrations of not more than 1% by weight, based on the weight of the mixture, may also be used.

Examples of UV stabilizers are various substituted resorcinols, salicylates, benzotriazoles and benzophenones, which are generally used in amounts of not more than 2% by weight.

Materials for increasing shielding against electromagnetic waves, such as metal flakes, powders or fibers or metal-coated fillers, may also be present.

Lubricants and mold release agents, which as a rule are added to the thermoplastic material in amounts of not more than 1% by weight, are stearic acid, stearyl alcohol, alkyl stearates and stearamides and esters of pentaerythritol with long-chain fatty acids.

The additives include stabilizers which prevent decomposition of red phosphorus in the presence of moisture and atmospheric oxygen. Examples are compounds of cadmium, of zinc, of aluminum, of silver, of iron, of copper, of antimony, of tin, of magnesium, of manganese, of vanadium, of boron and of titanium. For example, oxides of the stated metals, as well as carbonates or oxycarbonates, hydroxides and salts of organic and inorganic acids, such as acetates or phosphates or hydrogen phosphates or sulfates, are particularly suitable compounds.

The novel thermoplastic molding materials can be prepared by conventional processes, by mixing the starting components in a conventional mixing apparatus, such as an extruder, preferably a twin-screw extruder, a Brabender mill or a Banbury mill, or a kneader and then extruding the mixture. After extrusion, the extrudates are cooled and comminuted.

To obtain a very homogeneous molding material, thorough mixing is necessary. For this purpose, mean mixing times of from 0.2 to 30 minutes at from 280 to 380° C. are generally required. The order in which the components are mixed may be varied, for example two or if necessary three components can be premixed or all components may be mixed together. It may be advantageous to prepare the modified polyphenylene ether $B_2$ in a first zone of an extruder and to mix it with the remaining components of the novel molding material in one or more downstream zones of the extruder. Such a process is described in DE-A 37 02 582.

The novel molding materials have good impact strength combined with good rigidity. The surface of the injection moldings is uniformly colored, ie. it has no matt areas. Because of this property spectrum, the moldings produced from the novel molding materials are particularly suitable for automotive parts, sports equipment and electronic and electrical components.

EXAMPLES

Component (A1)

Polycaprolactam having a K value of 70, corresponding to a relative viscosity $\eta_{rel}$ 2.5.

Component (A2)

Polyhexamethyleneadipamide having a Fikentscher K value of 74, measured in a 1% strength by weight solution in 96% strength by weight sulfuric acid at 25° C. This K value corresponds to a relative viscosity $\eta_{rel}$ of 2.7.

Component (B1)

A modified polyphenylene ether of 94% by weight of poly-(2,6-dimethyl-1,4-phenylene) ether ($\eta_{red} = 0.48$, measured in a 1% strength by weight solution in chloroform at 25° C.),
  4.5% by weight of polystyrene (melt flow index MFI at b 200° C./5 kg load: 24 g/10 min),
  1.45% by weight of fumaric acid and
  0.05% by weight of 3,4-dimethyl-3,4-diphenylhexane (initiator)
was prepared by mixing the components at from 290 to 310° C. in a twin-screw extruder and then devolatilizing the mixture. The melt was passed through a water bath, granulated and dried.

Component (B2)

A modified polyphenylene ether of
  94% by weight of poly-(2,6-dimethyl-1,4-phenylene) ether ($\eta_{red} = 0.48$, measured in a 1% strength by weight solution in chloroform at 25° C.),
  4.5% by weight of polystyrene (melt flow index MFI at 200° C./5 kg load: 24 g/10 min),
  1.45% by weight of maleic anhydride and
  0.05% by weight of 3,4-dimethyl-3,4-diphenylhexane (initiator)
was prepared by mixing the components at from 290 to 310° C. in a twin-screw extruder and then devolatilizing the mixture. The melt was passed through a water bath, granulated and dried.

Component (B1*) (for comparison)

An unmodified polyphenylene ether having a mean molecular weight (weight average) $M_w$ of 30,000.

Component (C1)

Glass fibers treated with a polyurethane size and having a mean diameter of 13 μm.

Component (C2)

Glass fibers treated with an epoxy size and having a mean diameter of 10 μm.

Component (C3)

Carbon fibers having a mean diameter of 7 μm.

Component (D1)

Titanium dioxide (rutile type) having a density of 4 g/cm$^3$ and a median particle diameter ($d_{50}$) of 0.4 μm.

Component (D2)

Carbon black having a median particle diameter ($d_{50}$) of 13 nm and a specific surface area of 430 m$^2$/g.

Component (E1)

A block copolymer of
27% by weight of styrene and
63% by weight of hydrogenated isoprene.

Component (E2)

A random copolymer of
70% by weight of ethylene,
25% by weight of n-butyl acrylate and
5% by weight of acrylic acid.
MFI 21 g/10 min (190° C.; 2.16 kg)

Component (G)

Red phosphorus having a median particle size ($d_{50}$) of 45 μm.

PREPARATION OF THE MOLDING MATERIALS

Components A), B) and D), and, if required, E) to G) were mixed in a twin-screw extruder at a barrel temperature of 290° C. Component C) was added downstream through an orifice. The melt was passed through a water bath and granulated. The dried granules were injection molded at 290° C. to give standard small bars, dumb bells and circular disks.

Measurement of the impact strength $a_{72}$ was carried out according to DIN 53,435, and the tensile strength was determined according to DIN 53,455. The color impression was assessed visually in comparison with circular disks.

The median fiber length $l_{50}$ was determined both in the granules and in the injection molding. For this purpose, from 1 to 1.5 g of granules or molding were ashed at 500° C. (glass fibers). In the case of carbon fibers, the polymer matrix was dissolved in a mixture of hexafluoroisopropanol and chloroform (3:7). The remaining fibers were suspended in mineral oil on a microscope slide and photographed and counted under an optical microscope (magnification 40:1). In each micrograph (about 6 micrographs per 1.5 g), about 400–500 fibers were taken into account for determining the median fiber length $l_{50}$.

The results of the measurements and the composition of the molding materials are shown in the Table.

TABLE

| No. | Composition [% by weight] | | | | | | Impact strength $a_n$ [kJ/m$^2$] | Tensile strength [N/mm$^2$] | Color impression | Median fiber length $l_{50}$ [μm] |
|---|---|---|---|---|---|---|---|---|---|---|
| 1 | 35% A1 | 32% B1 | 30% C2 | 3% D1 | — | — | 34 | 155 | Uniform | 195 |
| 2 | 35% A2 | 33.5% B2 | 30% C1 | 1.5% D2 | — | — | 37 | 161 | Uniform | 260 |
| 3 | 39% A2 | 38.5% B2 | 20% C1 | 2% D1 + 0.5% D2 | — | — | 35 | 137 | Uniform | 290 |
| 4 | 39.5% A1 | 39.5% B1 | 20% C3 | 1% D2 | — | — | 30 | 189 | Uniform | 195 |
| 5 | 33% A2 | 30% B1 | 30% C1 | 3.3% D2 | — | 3% G | 36 | 169 | Uniform | 235 |
| 6 | 37% A2 | 30% B1 | 30% C1 | 1.5% D2 | 1.5% E1 | — | 33 | 153 | Uniform | 240 |
| 1*) | 31% A1 | 29% B1 | 30% C2 | 3% D1 | 7% E1 | — | 27 | 102 | Speckled | 140 |
| 2*) | 37.5% A1 | 35.5% B1 | 20% C2 | — | 7% E1 | — | 28 | 88 | Uniform | — |
| 3*) | 33% A2 | 30% B2 | 30% C1 | 3% D1 | 4% E2 | — | 27 | 112 | Speckled | 135 |

TABLE-continued

| No. | Composition [% by weight] | | | | | Impact strength $a_n$ [kJ/m$^2$] | Tensile strength [N/mm$^2$] | Color impression | Median fiber length $l_{50}$ [μm] |
|---|---|---|---|---|---|---|---|---|---|
| 4*) | 35% A1 | 27% B* | 30% C1 | 3% D1 | — | 5% X**) | 8 | 160 | Speckled | 140 |

*) Comparative Experiment according to EP 46 040
**) Copolymer of styrene (75%) and maleic anhydride (25%) (agent for imparting compatibility between phases)

We claim:

1. A filler-containing thermoplastic molding material containing, as essential components,
    A) from 10 to 84.8% by weight of a thermoplastic polyamide,
    B) from 10 to 84.4% by weight of a modified polyphenylene ether,
    C) from 5 to 50% by weight of glass fibers or carbon fibers or a mixture thereof, having a median fiber length $l_{50}$ of from 150 to 400 μm, and
    D) from 0.2 to 4% by weight of a pigment
and in addition
    E) from 0 to 4% by weight of a rubber impact modifier,
    F) from 0 to 20% by weight of a particulate filler which differs from D) and
    G) from 0 to 20% by weight of a flameproofing agent.

2. A filler-containing, thermoplastic molding material as claimed in claim 1, containing
    from 20 to 70% by weight of A),
    from 20 to 70% by weight of B),
    from 9.5 to 40% by weight of C) and
    from 0.5 to 3.5% by weight of D).

3. A filler-containing, thermoplastic molding material as claimed in claim 1, containing
    from 20 to 69.4% by weight of A),
    from 20 to 69.4% by weight of B),
    from 10 to 35% by weight of C),
    from 0.5 to 3% by weight of D) and
    from 0.1 to 2% by weight of E).

4. A filler-containing, thermoplastic molding material as claimed in claim 1, wherein the media fiber length $l_{50}$ of component C) is from 170 to 300 μm.

5. A filler-containing, thermoplastic molding material as claimed in claim 1, wherein component B) is a modified polyphenylene ether prepared from
    b$_1$) from 9.95 to 99.94% by weight of a polyphenylene ether,
    b$_2$) from 0 to 90% by weight of a vinylaromatic polymer,
    b$_3$) from 0.05 to 10% by weight of one or more compounds from the group consisting of
        b$_{31}$) an α,β-unsaturated dicarbonyl compound,
        b$_{32}$) an amide-containing monomer having a polymerizable double bond and
        b$_{33}$) a lactam-containing monomer having a polymerizable double bond,
    b$_4$) from 0 to 80% by weight of further graft-active monomers and
    b$_5$) from 0.01 to 0.09% by weight of a free radical initiator.

6. A filler-containing, thermoplastic molding material as claimed in claim 1, containing titanium dioxide or carbon black or a mixture thereof as component D).

7. A molding obtained from a thermoplastic molding material as claimed in claim 1.

* * * * *